United States Patent
Isert et al.

(10) Patent No.: US 9,286,689 B2
(45) Date of Patent: Mar. 15, 2016

(54) METHOD AND DEVICE FOR DETECTING THE GAIT OF A PEDESTRIAN FOR A PORTABLE TERMINAL

(71) Applicant: Bayerische Motoren Werke Aktiengesellschaft, Munich (DE)

(72) Inventors: Carsten Isert, Munich (DE); Dominik Gusenbauer, Munich (DE); Ferenc Aubeck, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 124 days.

(21) Appl. No.: 14/154,602

(22) Filed: Jan. 14, 2014

(65) Prior Publication Data
US 2014/0169628 A1   Jun. 19, 2014

Related U.S. Application Data

(63) Continuation of application No. PCT/EP2012/062612, filed on Jun. 28, 2012.

(30) Foreign Application Priority Data

Jul. 14, 2011 (DE) .......................... 10 2011 079 187

(51) Int. Cl.
*G06K 9/00* (2006.01)
*G06T 7/20* (2006.01)
*G01C 22/00* (2006.01)

(52) U.S. Cl.
CPC ............... *G06T 7/20* (2013.01); *G01C 22/006* (2013.01); *G06K 9/00362* (2013.01); *G06T 7/204* (2013.01); *G06T 2207/10016* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 6,141,041 | A * | 10/2000 | Carlbom et al. | ............... 348/169 |
| 6,421,463 | B1 * | 7/2002 | Poggio et al. | ................. 382/224 |
| 7,925,049 | B2 * | 4/2011 | Zhu | .......................... G06K 9/32 |
| | | | | 382/103 |
| 2004/0042661 | A1 * | 3/2004 | Ulrich et al. | ................... 382/181 |
| 2009/0005975 | A1 | 1/2009 | Forstall et al. | |
| 2010/0024531 | A1 | 2/2010 | Senoo | |

OTHER PUBLICATIONS

International Search Report (PCT/ISA/210) with English translation dated Aug. 23, 2012 (Five (5) pages).
German Search Report with English translation dated Apr. 27, 2012 (Ten (10) pages).
Amanatiadis, et al. "A fuzzy multi-sensor architecture for indoor navigation", Imagin Systems and Techniques (IST), 2010 IEEE International Conference on, pp. 452-457, Jul. 1-2, 2010, (Six (6) pages).

(Continued)

*Primary Examiner* — Hadi Akhavannik
(74) *Attorney, Agent, or Firm* — Crowell & Moring LLP

(57) ABSTRACT

A method and system for recognizing a pedestrian's step is provided for a portable terminal. The portable terminal has an acquisition unit. In an image of a sequence of images acquired by the acquisition unit, an object is, in each case, detected which represents at least a part of a foot, a shoe, and/or a leg. The position of the object is determined in the respective image, and a pedestrian's step is recognized as a function of a position change of the object between at least two images of the sequence of images.

17 Claims, 4 Drawing Sheets

(56) References Cited

OTHER PUBLICATIONS

Ruotsalainen, et al. "Overview of methods for visual-aided pedestrian navigation", Ubiquitous Positioning Indoor Navigation and Location Based Service (UPINLBS), 2010, IEEE, Piscataway, NJ, USA, Oct. 14, 2010, pp. 1-10.
International Preliminary Report on Patentability (PCT/IB/338 & PCT/IB/373), including Written Opinion (PCT/ISA/237) dated Jan. 23, 2014 (seven (7) pages).

* cited by examiner

METHOD AND DEVICE FOR DETECTING THE GAIT OF A PEDESTRIAN FOR A PORTABLE TERMINAL

CROSS REFERENCE TO RELATED APPLICATIONS

This application is a continuation of PCT International Application No. PCT/EP2012/062612, filed Jun. 28, 2012, which claims priority under 35 U.S.C. §119 from German Patent Application No. 10 2011 079 187.6, filed Jul. 14, 2011, the entire disclosures of which are herein expressly incorporated by reference.

BACKGROUND AND SUMMARY OF THE INVENTION

In the personal navigation field, navigation devices which utilize satellite signals for a position determination have gained acceptance in many areas of application, for example, as a carried-along global positioning system acquisition unit for hikers and climbers or for pedestrian tourists in a city. However, such navigation devices have the disadvantage that navigation functions perfectly only in the open air. Such navigation devices, which utilize satellite signals for a position determination, are not suitable for persons who are situated in buildings and can therefore not meet the demand for movement and position information in basements of large cities, in department stores, in museums, in airports and railway stations, as well as in basements of other companies or government buildings, for example. Currently, dedicated systems for interior applications—so-called indoor systems, for example, with infrared beacons—are used, which require high infrastructure expenditures.

It is an object of the invention to provide a method and a system for recognizing a pedestrian's step for a portable terminal, and to provide a portable terminal, which permit a reliable and cost-effective recognition of the pedestrian's step also in interior spaces.

This and other objects are achieved, according to a first and second aspect, by a method and a corresponding system for recognizing a pedestrian's step for a portable terminal, which has an acquisition unit. In an image of a sequence of images acquired by the acquisition unit, an object is in each case detected which represents at least a part of a foot, a shoe, and/or a leg. The position of the object is determined in the respective image, and a pedestrian's step is recognized as a function of a position change of the object between at least two images of the sequence of images.

An analysis of the respective image makes it possible to recognize the appearance and disappearance of the pedestrian's foot or of the tip of the pedestrian's foot and to use a step count and/or an estimation of the length of a step for recognizing a step. The determination of the steps can advantageously take place independently of further hardware components, particularly independently of further sensors, which are designed for acquiring measured data representative of a pedestrian's movement. This permits a cost-effective production of the terminal. The method according to the invention can be used for a step recognition for pedestrians moving in buildings as well as for pedestrians who are moving in the open air. The method according to the invention further has the advantage that steps can be reliably recognized even if the walking movement is slow and/or if the walking movement is irregular.

When acquiring the respective images, the terminal is preferably arranged on the pedestrian or is held by the pedestrian such that an image acquisition range of the acquisition unit, in each case, comprises a specified range in front of the pedestrian in the walking direction. The acquisition unit and/or a further appropriately designed unit of the terminal may be designed for signaling to the pedestrian by means of the output of signals, for example, visual signals, a specified positioning of the acquisition unit.

In an advantageous further development, the object is detected as a function of a similarity comparison of a specified model with the respective image. This permits a simple and reliable detection of the object.

In a further advantageous development, the model is determined as a function of an image detail of one of the acquired images, which includes at least a tip of the pedestrian's foot and/or shoe. This makes it possible to adapt the model to specific features of the pedestrians foot or shoe and therefore increase a reliability of the object detection and/or of the step recognition.

In a further advantageous development, a course of the position of the object is determined for the sequence of images, and the step is recognized as a function of the course. Advantageously, the respective step can thereby be very easily and reliably recognized.

In a further advantageous development, the image is subdivided into several image details, which may overlap. The similarity comparison with the model is carried out for each image detail. The position of the object is determined as a function of the image detail that has the greatest similarity to the model.

In a further advantageous development, the respective image has a matrix of pixels. For all central pixels, which each represent a center point of the respective image detail, one comparison value respectively is determined which represents a measurement for the similarity of the model to the respective image detail. The position of the object is determined as a function of the determined comparison values. This advantageously permits a simple detection of the object. The comparison value may, for example, represent a cross correlation coefficient, which is determined for the respective central pixel as a function of a cross correlation between the image detail and the model.

In a further advantageous development, a maximal comparison value is determined as a function of the comparison values, and the model is adapted when the maximal comparison value falls below a specified limit value. An analysis of the maximal comparison values permits the detection of changed conditions in the pedestrian's surroundings. This can be utilized for adapting the model to the changed conditions, for example, for adapting the model to changed brightness conditions.

In a further advantageous development, the pixels of the image have one color value respectively for a specified quantity of color channels. For at least one portion of the quantity of color channels, the comparison values are determined for the respective color channel. This advantageously allows a reliable similarity comparison of the image detail with the model and can thereby contribute to being able to very easily and reliably recognize the respective step. In this case, the respective color channel represents a primary color of a color space used for storing the image. A red-green-blue image (RGB image), for example, has three color channels, one each for red, green and blue. A CYMK image (cyan, yellow, magenta and black) has four color channels, one each for cyan, yellow, magenta and the black fraction.

In a further advantageous development, the pixels of the image each have a gray value from a specified quantity of gray values. Before the similarity comparison, an average gray value of the image is determined as a function of the gray values of at least a portion of the pixels, and the image is converted to a binary image, in which the respective pixels can assume only one of two conceivable gray values such that, as a function of the average gray value and the gray value of the respective pixel, the respective pixel has a specified first or second gray value. Advantageously, this permits a very simple and fast detection of the object. In the case of the binary image, the first gray value preferably represents the color white and the second gray value represents the color black. For determining the average gray value, for example, a gray-value histogram can be determined for the image, and the average gray value can be determined as a function of a variance of the gray values.

According to a third aspect, the invention is distinguished by a portable terminal which has an acquisition unit and a system according to the second aspect. Here, advantageous further developments of the first and second aspect also apply to the third aspect.

Other objects, advantages and novel features of the present invention will become apparent from the following detailed description of one or more preferred embodiments when considered in conjunction with the accompanying drawings.

DETAILED DESCRIPTION OF THE DRAWINGS

Elements of the same construction or function have the same reference numbers in all figures.

Figure 1:
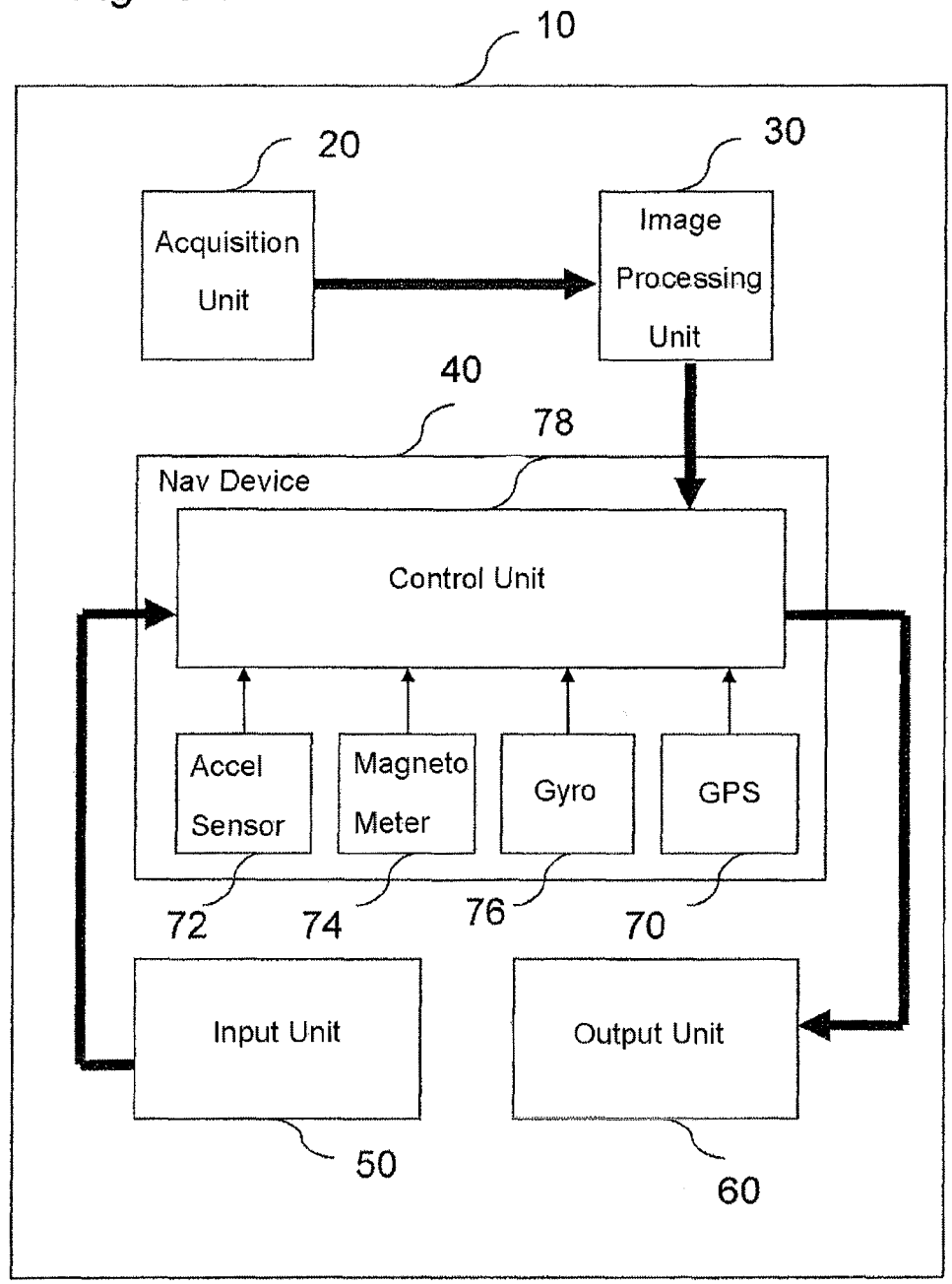
FIG. 1 is a view of an example of a block diagram for a portable terminal.

FIG. 1 illustrates a portable terminal 10. The portable terminal is, for example, designed as a Smartphone, a personal digital assistant (PDA) and/or as a portable computer.

The portable terminal 10 includes, for example, an acquisition unit 20 and an image processing unit 30, which may also be called a system for recognizing a pedestrian's step. The acquisition unit 20 is designed, for example, as a digital camera.

For acquiring images by means of the acquisition unit 20 for an analysis by the image processing unit 30, the terminal 10 is preferably arranged on the pedestrian or is held by the pedestrian in such a manner that an image detection range of the acquisition unit 20, in each case, includes a specified range in the walking direction in front of the pedestrian. A suitable position of the acquisition unit 20 for acquiring the respecting image corresponds to a holding position of a map which the pedestrian holds in front of himself for reading the map.

The image processing unit 30 includes, for example, a processor and a program memory. A program for recognizing the pedestrian's step, for example, is stored in the program memory. The program is used, for example, for providing step recognition data for a personal navigation. As an example, the program will be explained below with reference to FIG. 2.

Furthermore, according to FIG. 1, the portable terminal 10 includes, for example, a navigation device 40 for pedestrians. The portable terminal 10 may, for example, have at least one input unit 50 and at least one output unit 60, which are coupled with the navigation device 40. The at least one input unit 50 may, for example, have a plurality of key elements, by which a user can input, for example, a starting point and/or a destination point for a route determination. By means of the output unit 60, which includes, for example, a display and/or a loudspeaker, for example, a current position and/or a determined route can be signaled to a user.

The navigation device 40 can further have a GPS module 70, as well as a magnetometer 74, a gyroscope 76 and/or an acceleration sensor 72 which are each coupled to a control unit 78 of the navigation device 40.

The control unit 78 of the navigation device 40 is designed, for example, for detecting steps of the pedestrian as a function of at least one acquired measuring signal of the acceleration sensor 72.

The control unit 78 of the navigation device 40 is, for example, coupled with the image processing unit 30 such that data, which are determined by the image processing unit 30, can be forwarded to the control unit 78 of the navigation device 40. The data can advantageously be utilized for verifying step recognition data that were determined by the control unit 78 as a function of the at least one measuring signal of the acceleration sensor 72. As an alternative or in addition, it is contemplated that the data forwarded by the image processing unit 30 are utilized for determining the pedestrian's current position, the pedestrian's step length and/or the pedestrian's moving direction.

Figure 2:
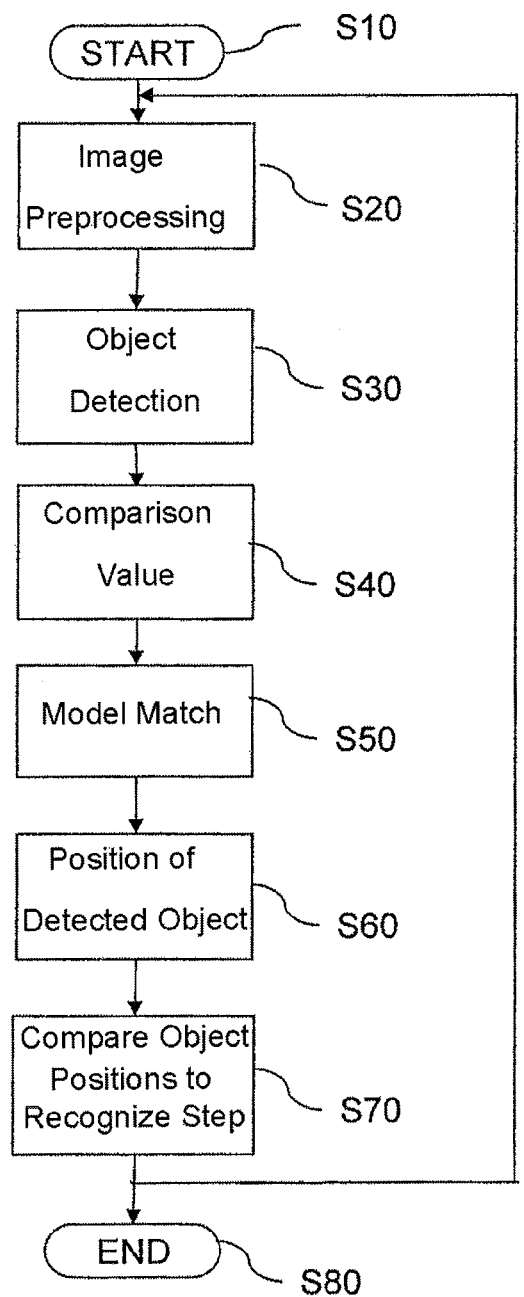
FIG. 2 is a view of an example of a flow chart for a program for recognizing a pedestrian's step.

FIG. 2 shows a flow chart of the program for recognizing the pedestrian's step.

The program is preferably started by a Step S10, by which, if required, variables, such as counters, are initialized.

In a Step S20, a digital preprocessing of an image acquired by the acquisition unit 20 can take place. This image is, for example, a digital image having a matrix of pixels. The image may, for example, have a first number of pixels with respect to an image plane in the direction of a horizontal axis x, and a second number of pixels in the direction of a vertical axis y. The preprocessing may, for example, comprise a filtering of the image. As an alternative or in addition, for example, an image acquired by the acquisition unit 20, if it is a colored image, can be changed to a black-and-white image, in which the respective pixels of the image have a gray value from a specified quantity of gray values. In this case, for example, a gray value can be assigned to each color value. In addition or as an alternative, the image may be changed to a binary image, in which the respective pixels can assume only one of two conceivable gray values. For example, as a function of at least a portion of the pixels of the image, an average gray value of the image can be determined, and the image can be changed to a binary image such that, as a function of the average gray value and the gray value of the respective pixel, the respective pixel will have a first or second gray value.

In a Step S30, an object is detected in the processed image, which represents at least a part of a foot, a shoe, and/or a leg. The object is, for example, detected as a function of a similarity comparison of a specified model with the respect image. The model preferably has a second matrix of pixels. The model may, for example, have a third number of pixels with respect to an image plane of the image in the horizontal direction, and a fourth number of pixels in the vertical direction. The number of pixels of the model preferably is smaller than the number of pixels of the respective image.

For the object detection, the image can be subdivided into several image details. For all central pixels, which each represent a center point of the respective image detail, a comparison value can be determined which represents a measurement of the similarity of the model with the image detail. In this case, the respective image details may overlap. For a very reliable object detection, the image details may be selected such that each pixel of the image, in each case, is also a central pixel for which a comparison value is determined. A first comparison value for the respective pixel can be determined, for example, depending on a cross correlation function. As an alternative or in addition, a normalized comparison value of the respective pixel can be determined depending on a normalized cross correlation function.

In the event that, for example, a color image is analyzed and the pixels of the image each have a color value for a specified quantity of color channels, the comparison values can be determined, for example, for each color channel. If the image is designed, for example, as a red-green-blue image, the comparison values can be determined for each color channel—the red, the green and the blue color channel.

In a Step S40, a maximal comparison value is determined, for example, as a function of the normalized comparison values that were determined for the image.

In a Step S50, it may, for example, be checked whether the model sufficiently matches the object to be detected. If that is not so, the model can be adapted. For this purpose, it is, for example, checked whether the determined maximal comparison value falls below a specified limit value. If the maximal comparison value falls below the limit value, the model will be adapted. In order to exclude short-term fluctuations, for example, several images of the sequence of images may be analyzed. This may take place, for example, such that the model will be adapted when the maximal comparison values of several images fall below the limit value within a specified time. For adapting the model, an updated model may, for example, be determined as a function of an image detail of one of the acquired images which comprises at least a tip of the pedestrian's foot and/or shoe. The updated model can then be used for the similarity comparisons which follow.

In a Step S60, the position of the detected object is determined. For this purpose, for example, the position of the pixel in the image is determined which has the maximal comparison value.

Figure 4:
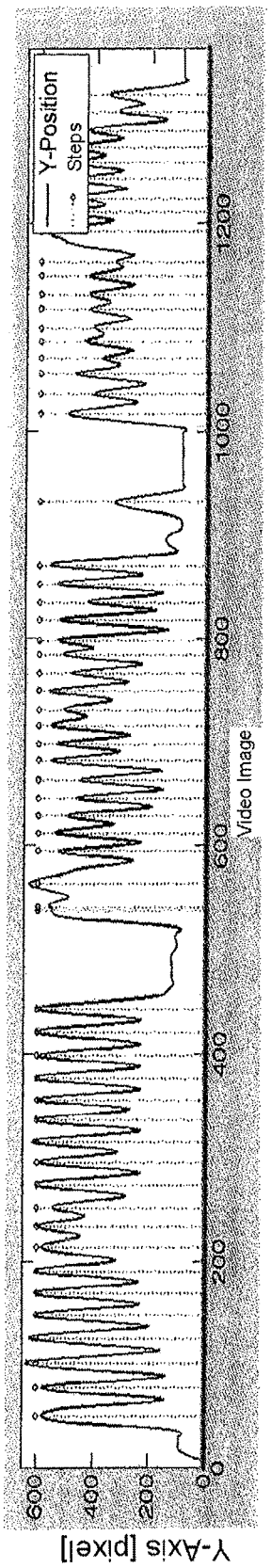
FIG. 4 is a view of an example of the course of the position of the object in a sequence of images.

In a Step S70, the position of the object in the image is compared at least with the position of the object in a further image of the image sequence, and a pedestrian's step is recognized as a function of a position change of the object. In order to improve the reliability of the step recognition, for example, a course of the position of the object in the image sequence can be determined, and the step can be detected as a function of the course. For this purpose, for example, the position of the object can be analyzed in a spatial direction which essentially comprises the pedestrian's moving direction. The two-dimensional problem is thereby reduced to a one-dimensional problem. FIG. 4 shows such a course of the position of the object along the vertical axis y. The course has several local maxima, which are each interpreted as a step.

The program can be terminated in a Step S80. However, the program is preferably regularly run during an active personal navigation operating mode of the terminal 10.

Figure 3:
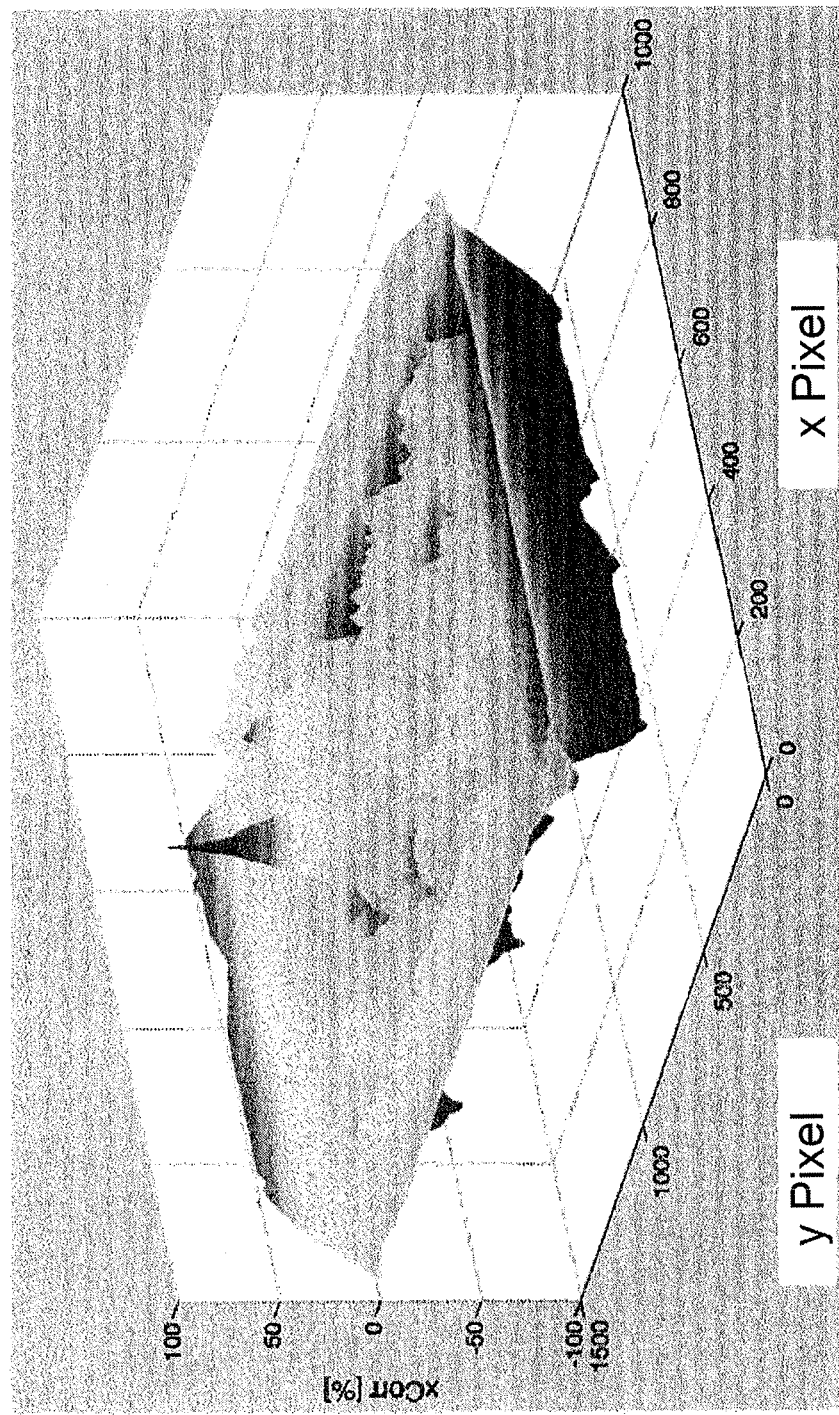
FIG. 3 is a view of an example of the course of values of a correlation matrix determined for an image.

FIG. 3 illustrates a value chart for a correlation matrix which was determined according to FIG. 2 for one of the detected images. The correlation matrix shows a maximum in the position in which the model has the greatest similarity to the image detail.

FIG. 4 shows the course of the position of the object along the vertical axis y of the image for a sequence of images. Here, the image sequence was acquired over several steps of the pedestrian. In an alternating manner, the course in each case has a local minimum and a local maximum. For example, the local maxima can in each case be interpreted as a step.

Figure 5:
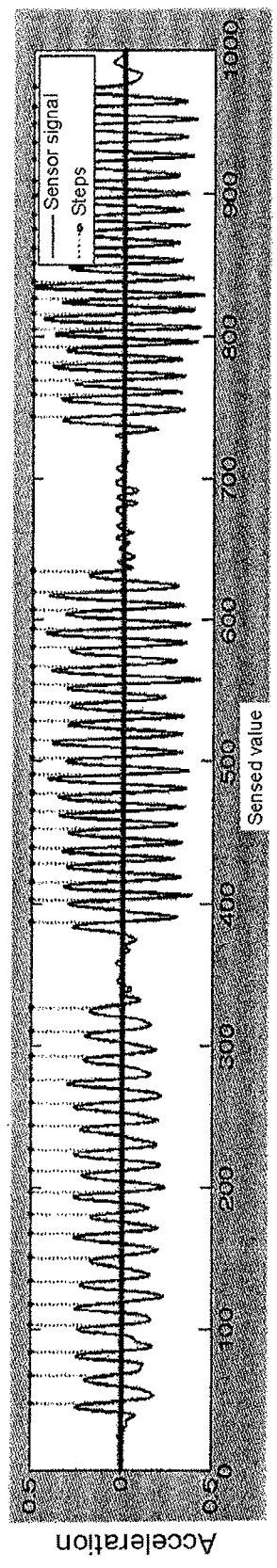
FIG. 5 is a view of an example of the signal path of an acceleration sensor which is carried along by the pedestrian for a movement detection.

In comparison to FIG. 4, FIG. 5 shows a signal path of the acceleration sensor 72 which was carried along by the pedestrian for a movement detection.

LIST OF REFERENCE SYMBOLS

10 Terminal
20 Acquisition unit
30 Image processing unit
40 Navigation device
50 Input unit
60 Output unit
70 GPS module
72 Acceleration sensor
74 Magnetometer
76 Gyroscope
78 Control unit
S10 . . . S80 Program steps
x Horizontal axis
y Vertical axis The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a portable terminal for recognizing a pedestrians step, the method comprising the acts of:
   acquiring, via an acquisition unit of the portable terminal operated by the pedestrian, a sequence of images of the pedestrian;
   detecting, in each image of the sequence of images, an object representing at least a part of a foot, a shoe, and/or a leg of the pedestrian;
   determining a position of the object in the respective image;
   recognizing a step of the pedestrian as a function of a position change of the object between at least two images of the sequence of images; and
   signaling to the pedestrian at least one of a current position and a determined route of the portable terminal based in part on the recognized step.

2. The method according to claim 1, wherein the object is detected as a function of a similarity comparison of a specified model with the respective image.

3. The method according to claim 2, wherein the model is determined as a function of an image detail of one acquired image, which one acquired image comprises at least a tip of the foot and/or shoe of the pedestrian.

4. The method according to claim 1, wherein a course of the position of the object is determined for the sequence of images, and the step of the pedestrian is recognized as a function of the course.

5. The method according to claim 2, wherein
   the image is subdivided into several image details,
   the similarity comparison with the model is carried out for each of the several image details, and
   the position of the object is determined as a function of the image detail having a greatest similarity to model.

6. The method according to claim 3, wherein
the image is subdivided into several image details,
the similarity comparison with the model is carried out for each of the several image details, and
the position of the object is determined as a function of the image detail having a greatest similarity to model.

7. The method according to claim 5, wherein
a respective image has a matrix of pixels,
for one central pixel respectively, representing a center point of the respective image detail, one comparison value is determined that represents a measurement for the similarity of the model to the respective image detail, and
as a function of the determined comparison values, the position of the object is determined.

8. The method according to claim 6, wherein
a respective image has a matrix of pixels,
for one central pixel respectively, representing a center point of the respective image detail, one comparison value is determined that represents a measurement for the similarity of the model to the respective image detail, and
as a function of the determined comparison values, the position of the object is determined.

9. The method according to claim 7, wherein
as a function of the determined comparison values, a maximal comparison value is determined, and
when the maximal comparison value falls below a specified limit value, the model is adapted.

10. The method according to claim 8, wherein
as a function of the determined comparison values, a maximal comparison value is determined, and
when the maximal comparison value falls below a specified limit value, the model is adapted.

11. The method according to claim 7, wherein
pixels of the image have one color value respectively for a specified quantity of color channels, and
for at least one portion of the quantity of color channels, the determined comparison values are determined for the respective color channel.

12. The method according to claim 9, wherein
pixels of the image have one color value respectively for a specified quantity of color channels, and
for at least one portion of the quantity of color channels, the determined comparison values are determined for the respective color channel.

13. The method according to claim 7, wherein pixels of the image each have a gray value from a specified quantity of gray values, and
wherein before the similarity comparison,
an average gray value of the image is determined as a function of the gray values of at least a portion of the pixels, and
the image is converted to a binary image in which respective pixels assume only one of two possible gray values such that, as a function of the average value and the gray value of the respective pixel, the respective pixel has a specified first or second gray value.

14. The method according to claim 9, wherein pixels of the image each have a gray value from a specified quantity of gray values, and
wherein before the similarity comparison,
an average gray value of the image is determined as a function of the gray values of at least a portion of the pixels, and
the image is converted to a binary image in which respective pixels assume only one of two possible gray values such that, as a function of the average value and the gray value of the respective pixel, the respective pixel has a specified first or second gray value.

15. A system for recognizing a pedestrians step, comprising:
a portable terminal operated by a pedestrian, wherein the portable terminal comprises:
an image acquisition unit operatively configured to acquire a sequence of images;
an image processing unit operatively configured to, in each case, detect an object in acquired images which represents at least part of a foot, a shoe, and/or a leg of the pedestrian;
a control unit operatively configured to:
determine a position of the object in a respective image,
recognize a step of the pedestrian as a function of a position change of the object in at least two images of the sequence of images, and
signal to the pedestrian at least one of a current position and a determined route of the portable terminal based in part on the recognized step.

16. The method of claim 1, wherein said signaling to the pedestrian comprises displaying, on a display of the portable terminal, the at least one of the current position and the determined route of the portable terminal based in part on the recognized step.

17. The system of claim 1, wherein the control unit is operatively configured to signal to the pedestrian by displaying, on a display of the portable terminal, the at least one of the current position and the determined route of the portable terminal based in part on the recognized step.

* * * * *